(12) United States Patent
Kim et al.

(10) Patent No.: US 10,222,284 B2
(45) Date of Patent: Mar. 5, 2019

(54) PRESSURE SENSOR FOR A BRAKE SYSTEM

(71) Applicant: Tyco Electronics AMP Korea Co. Ltd, Gyungsangbuk-do (KR)

(72) Inventors: Young Deok Kim, Seoul (KR); Eul Chul Byeon, Seoul (KR); Kyung Hwan Oh, Seoul (KR); Won Jong Choi, Gyeongsangbuk-do (KR)

(73) Assignee: Tyco Electronics AMP Korea Co. Ltd., Gyungsangbuk-do (KR)

(*) Notice: Subject to any disclaimer, the term of this patent is extended or adjusted under 35 U.S.C. 154(b) by 71 days.

(21) Appl. No.: 15/433,600

(22) Filed: Feb. 15, 2017

(65) Prior Publication Data

US 2017/0160158 A1 Jun. 8, 2017

Related U.S. Application Data

(63) Continuation of application No. PCT/KR2015/008582, filed on Aug. 18, 2015.

(30) Foreign Application Priority Data

| Aug. 19, 2014 | (KR) | 10-2014-0107897 |
| Oct. 10, 2014 | (KR) | 10-2014-0136763 |
| Oct. 30, 2014 | (KR) | 10-2014-0149216 |

(51) Int. Cl.
*G01L 9/04* (2006.01)
*G01L 19/00* (2006.01)
(Continued)

(52) U.S. Cl.
CPC ........ *G01L 19/0069* (2013.01); *G01L 9/0051* (2013.01); *G01L 9/04* (2013.01);
(Continued)

(58) Field of Classification Search
None
See application file for complete search history.

(56) References Cited

U.S. PATENT DOCUMENTS 5,181,417 A 1/1993 Nishida et al.
5,315,877 A * 5/1994 Park .................... G01L 9/0075
73/718

(Continued)

FOREIGN PATENT DOCUMENTS

DE 102012220032 A1 5/2014
EP 2390641 11/2011
(Continued)

OTHER PUBLICATIONS

European Search Report, dated Mar. 2, 2018, 11 pages.
PCT International Search Report, dated Oct. 27, 2015, 3 pages.
Korean Office Action, dated Aug. 5, 2018, 10 pages.

*Primary Examiner* — Andre J Allen
(74) *Attorney, Agent, or Firm* — Barley Snyder

(57) ABSTRACT

A pressure sensor is disclosed. The pressure sensor has a sensor module having a strain gauge measuring a pressure of a gas flowing into a passage of the sensor module, a substrate electrically connected to the strain gauge, a frame covering a portion of the sensor module and supporting the substrate, a terminal electrically connected to the substrate and contacting a contact point of an external device, a terminal holder supporting the terminal, and a housing having an end connected to the sensor module and covering a portion of the terminal holder.

17 Claims, 27 Drawing Sheets

(51) Int. Cl.
*G01L 9/00* (2006.01)
*G01L 19/14* (2006.01)
*H01R 13/24* (2006.01)

(52) U.S. Cl.
CPC ........ *G01L 19/0084* (2013.01); *G01L 19/142* (2013.01); *H01R 13/2428* (2013.01)

(56) References Cited

U.S. PATENT DOCUMENTS

| | | |
|---|---|---|
| 7,412,894 B2 | 8/2008 | Ueyanagi et al. |
| 8,596,133 B2 | 12/2013 | Lee et al. |
| 2004/0007073 A1 | 1/2004 | Weise |
| 2008/0148860 A1 | 6/2008 | Murakami et al. |
| 2013/0255391 A1 | 10/2013 | Schlitzkus et al. |
| 2014/0331776 A1 | 11/2014 | Petrarca |
| 2014/0360277 A1* | 12/2014 | Iimori ................ G01L 19/0069 73/715 |
| 2016/0187216 A1* | 6/2016 | Hata ..................... G01L 9/0051 73/720 |
| 2016/0252418 A1* | 9/2016 | Schoot Uiterkamp ..................... G01L 9/0051 73/726 |
| 2017/0059438 A1* | 3/2017 | Ite ......................... G01L 27/002 |
| 2017/0175220 A1* | 6/2017 | Yamagishi ............... C21D 1/18 |

FOREIGN PATENT DOCUMENTS

| | | |
|---|---|---|
| EP | 2620757 A1 | 7/2013 |
| JP | 10-332519 A | 12/1998 |
| JP | 2006266869 A | 5/2006 |
| JP | 2008-151738 A | 7/2008 |
| JP | 2013062060 A | 4/2013 |
| KR | 10-2011-0088173 A | 8/2011 |
| KR | 10-2012-0077210 A | 10/2012 |
| KR | 10-2014-0042206 A | 4/2014 |
| KR | 10-2014-0042209 A | 4/2014 |
| KR | 10-2011-0130359 | 12/2017 |

* cited by examiner

10

PRESSURE SENSOR FOR A BRAKE SYSTEM

CROSS-REFERENCE TO RELATED APPLICATIONS

This application is a continuation of PCT International Application No. PCT/KR2015/008582, filed on Aug. 18, 2015, which claims priority under 35 U.S.C. § 119 to Korean Patent Application No. 1020140107897, filed on Aug. 19, 2014, Korean Patent Application No. 1020140136763, filed on Oct. 10, 2014, and Korean Patent Application No. 1020140149216, filed on Oct. 30, 2014.

FIELD OF THE INVENTION

The present invention relates to a pressure sensor.

BACKGROUND

A pressure sensor refers to a device configured to sense or measure a pressure. For example, the pressure sensor may detect information for controlling a brake system. In general, the brake system is provided in a vehicle to reduce a speed of the vehicle or brake the vehicle. The brake system may include a pedal configured to transfer an operation force of a user, a booster, a master cylinder connected to the pedal and forming a brake pressure, and a wheel brake braking a wheel of the vehicle based on the brake pressure input from the booster and the master cylinder.

In such a brake system, when a driver steps on a brake pedal and a braking force is generated, a tire of a vehicle may slip on a road in response to a frictional force generated in a wheel brake due to a brake pressure being greater than a braking force generated on the road. When the tire slips, a steering system may be locked and the vehicle may not steer in a desired direction.

In related arts, an anti-lock brake system (ABS) configured to electronically control a pedal effect of a brake to enable steering despite a slip is developed. The ABS may include a plurality of solenoid valves configured to adjust a brake pressure to be transferred to a wheel brake, a hydraulic unit including a low-pressure accumulator and a high-pressure accumulator, and an electronic control unit (ECU) configured to control components that electrically operate. In addition, the hydraulic unit may include a pressure sensor configured to detect a brake operating pressure generated in a master cylinder in proportion to a brake pedal effect, and transfer the detected brake operating pressure as an electrical signal to the ECU. The ECU may then control an operation of the brake based on the electrical signal transmitted from the pressure sensor.

SUMMARY

An object of the invention, among others, is to provide a pressure sensor that is small in volume. The disclosed pressure sensor has a sensor module having a strain gauge measuring a pressure of a gas flowing into a passage of the sensor module, a substrate electrically connected to the strain gauge, a frame covering a portion of the sensor module and supporting the substrate, a terminal electrically connected to the substrate and contacting a contact point of an external device, a terminal holder supporting the terminal, and a housing having an end connected to the sensor module and covering a portion of the terminal holder.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
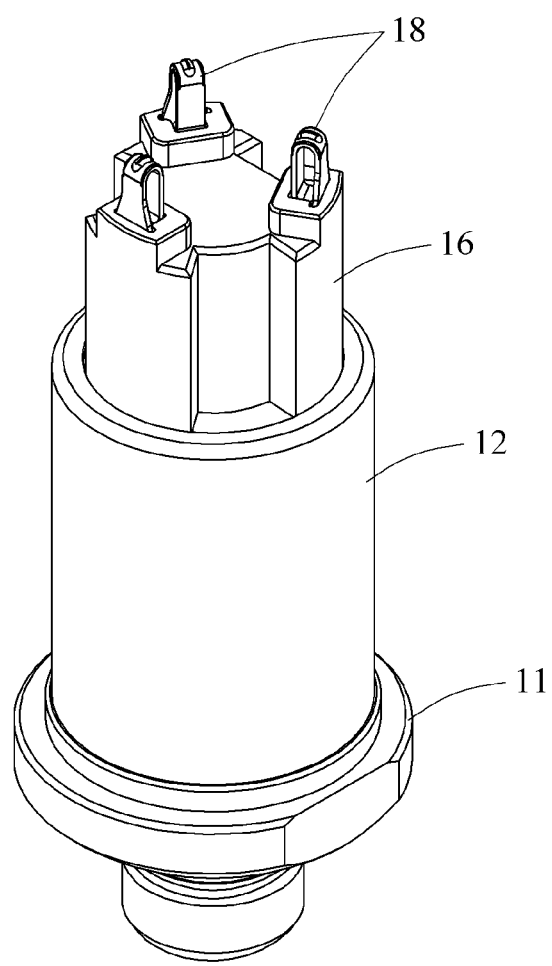
FIG. 1 is a perspective view of a pressure sensor according to a first embodiment of the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 2A:
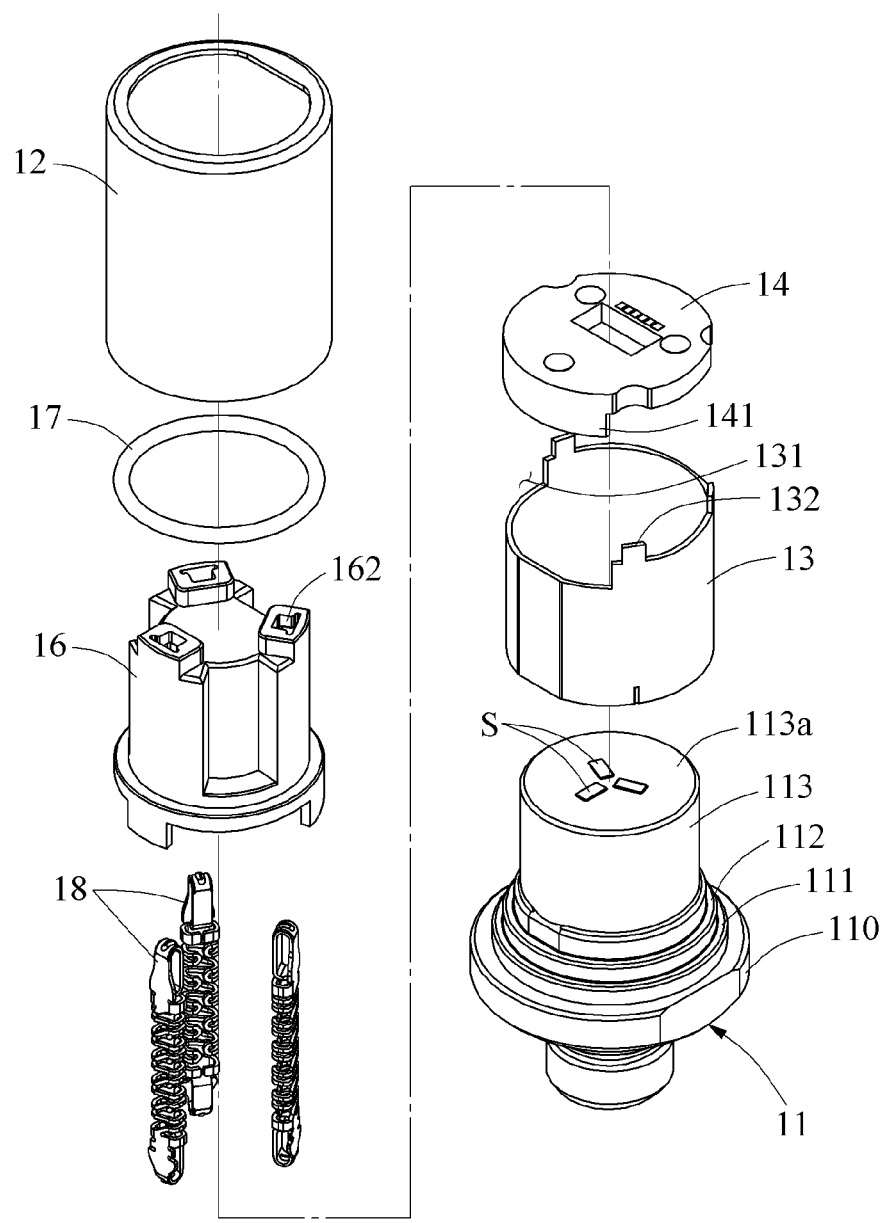
FIG. 2A is an exploded perspective view of the pressure sensor of FIG. 1.
Figure 2B:
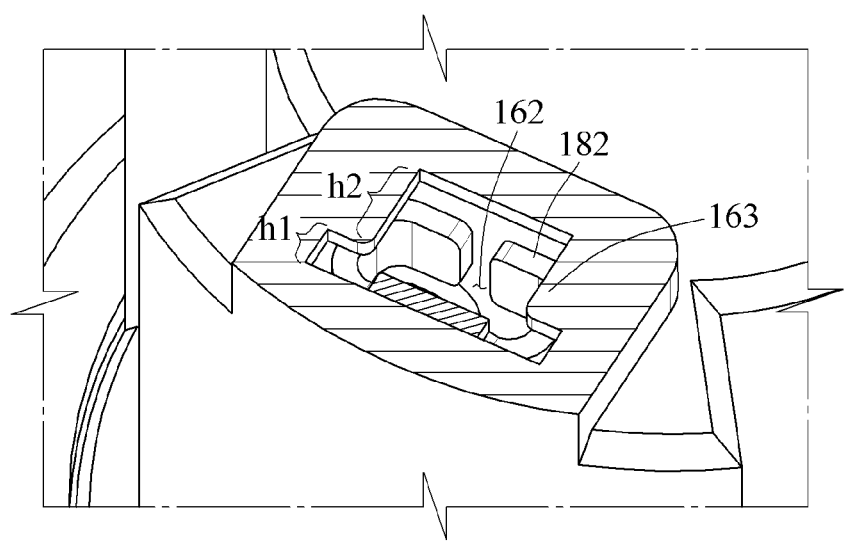
FIG. 2B is an enlarged view of the pressure sensor of FIG. 1.
Figure 3:
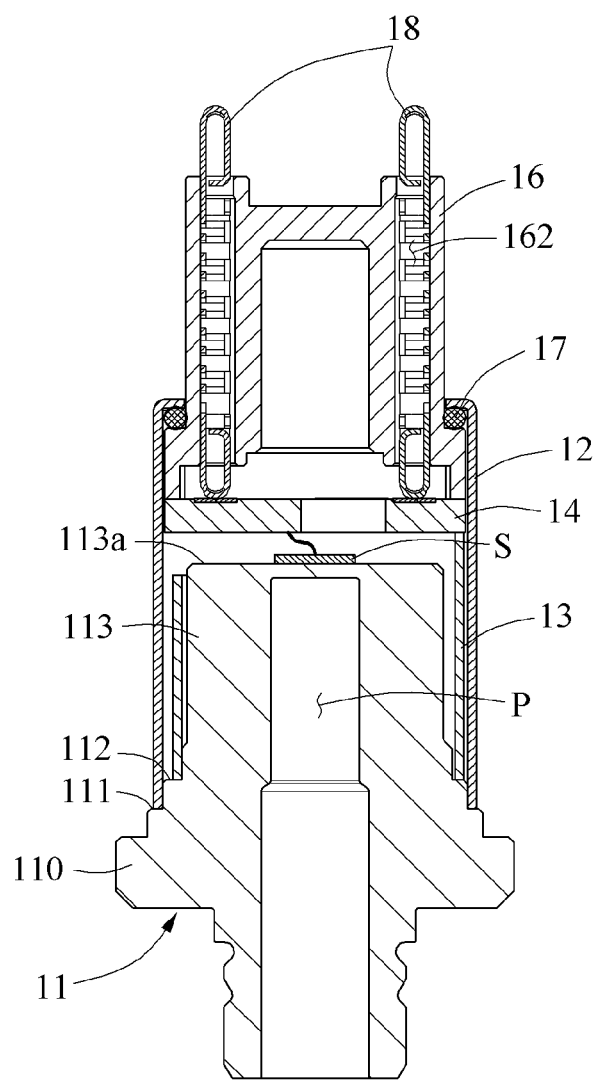
FIG. 3 is a sectional view of the pressure sensor of FIG. 1.

A pressure sensor 10 according to the invention is shown in FIGS. 1-3. The pressure sensor 10, as shown in FIGS. 1-3, includes a sensor module 11, a housing 12, a frame 13, a substrate 14, a terminal holder 16, an o-ring 17, and a terminal 18.

The sensor module 11 measures a pressure of a gas flowing into a passage P disposed therein and shown in FIG. 3. The sensor module 11 includes a sensing port 110, a sensing body 113, and a strain gauge S.

The sensing port 110 may be disposed in an inflow side of the passage P into which the gas flows, and includes a port exposed externally. The sensing port 110 may be connected to a target object for which a pressure is to be measured, and transfer a gas flowing from the target object to the sensing body 113. The sensing port 110 includes a housing support 111 and a frame support 112.

The housing support 111 is stepped to allow an end portion of the housing 12 to be placed on the housing support 111. Similarly, the frame support 112 is stepped to allow an end portion of the frame 13 to be placed on the frame support 112. A diameter of the frame support 112 may be smaller than a diameter of the housing support 111.

The sensing body 113 includes a passage to be connected to a passage provided in the sensing port 110. The sensing body 113 may be disposed in the housing 12 and/or the frame 13 to be prevented from being damaged by an external force, and also prevented from being affected by an influence of another element, excluding the target object connected to the sensing port 110. Thus, accuracy in measurement performed by the sensor module 11 may be improved.

The sensing body 113 includes a sensing plate 113a to which the strain gauge S is to be mounted. The sensing plate 113a may be provided in a flat form to improve accuracy in measurement performed by the strain gauge S. The sensing plate 113a is disposed opposite to the sensing port 110. The sensing plate 113a extends orthogonal to a longitudinal direction of the housing 12.

The housing 12 forms an outer shape of the pressure sensor 10. One side of the housing 12 is connected to the sensor module 11, and another side to the terminal holder 16. The housing 12 covers the frame 13, the sensing body 113, and/or the substrate 14 that are disposed between the sensor module 11 and the terminal holder 16. An upper side of the housing 12 may be bent inwards to cover a portion of the terminal holder 16. That is, the housing 12 may prevent the terminal holder 16 from being separated upwards. The housing 12 may be provided mostly in a cylindrical form, but a form of the housing 12 is not limited to the example described in the foregoing.

The frame 13 is disposed inside the housing 12 and covers the sensing body 113. The frame 13 is separated from the sensing body 113 by a predetermined distance so that the sensing body 113 may not be affected by interference with another component. One side of the frame 13 may be connected to the substrate 14, and another side to the sensing port 110. The frame 13 may be formed of, for example, a metallic material. The frame 13 includes an accommodating groove 131 and a supporting protrusion 132 to support the substrate 14. The accommodating groove 131 may be provided in a form retracted from an end portion of an upper side of the frame 13. The supporting protrusion 132 may be provided in a form protruding from the end portion of the upper side of the frame 13.

The substrate 14 receives a signal measured by the strain gauge S and externally transfers the received signal through the terminal 18. The substrate 14 and the strain gauge S may be connected to each other through a wire. The wire is electrically connected to the terminal 18 that is to be connected to a contact point of the substrate 14 along an internal circuit formed in the substrate 14. The substrate 14 is disposed on an upper side of the frame 13. The substrate 14 includes a connecting protrusion 141 and a connecting groove to be connected to the frame 13. The connecting protrusion 141 and the connecting groove may be connected to the accommodating groove 131 and the supporting protrusion 132, respectively.

The terminal holder 16 supports the terminal 18. The terminal holder 16 includes a terminal guide hole 162 to accommodate the terminal 18. A form of the terminal guide hole 162 may correspond to a form of the terminal 18. The terminal guide hole 162 has a diameter corresponding to an external diameter of the terminal 18. Using the terminal guide hole 162, the terminal 18 is prevented from being bent by a force transferred from a contact point of an external device to the terminal 18 when the terminal 18 comes into contact with the contact point of the external device. The terminal holder 16 may be disposed on an upper side of the substrate 14. At an upper end of the terminal holder 16, a shield 163 is disposed to shield a portion of the terminal guide hole 162. The shield 163 supports an upper end of a resilient portion 182 of the terminal 18 and thus prevents the terminal 18 from being separated out of an upper side of the terminal guide hole 162. A contactor 181 of the terminal 18 protrudes from a portion that is not shielded by the shield 163.

An upper face of the terminal holder 16 includes a T-shaped hole. As shown in FIG. 2B, the upper face of the terminal holder 16 includes a first hole h1 and a second hole h2 having different widths from each other. A width of the second hole h2 may be smaller than a width of the first hole h1 by a width of the shield 163. In addition, as shown in FIG. 4B, the contactor 181 includes a portion having a width that is decreased further from the resilient portion 182. A portion of the contactor 181 with a greater width as being closer to the resilient portion 182 may protrude, while being inserted, from the terminal guide hole 162 through the first hole h1 with a broad width that is not shielded by the shield 163. Also, an end portion of the contactor 181 may be inserted, while being folded back, into the terminal guide hole 162 through the second hole h2 with a narrower width than that of the first hole h1. Here, a width of the portion of the contactor 181 with the greater width that is adjacent to the resilient portion 182 may correspond to the width of the first hole h1. Based on such a form, the terminal 18 may be maintained at a predetermined position.

The o-ring 17 is disposed between the terminal holder 16 and the housing 12. Using the o-ring 17 may improve a binding force between the terminal holder 16 and the housing 12, and prevent dust or water from penetrating between the terminal holder 16 and the housing 12. The o-ring 17 is inserted into, for example, a stepped portion of the terminal holder 16.

The terminal 18 transfers a signal from the strain gauge S to the external device. The terminal 18 is connected to the substrate 14 through the terminal holder 16. One side of the terminal 18 is connected to the substrate 14 and another side to the contact point of the external device. The terminal 18 extends along the longitudinal direction of the housing 12. The terminal 18 may be resiliently transformed along the longitudinal direction of the housing 12 to improve a contact force with the contact point of the external device. A detailed form of the terminal 18 will be described hereinafter.

Figure 4A:
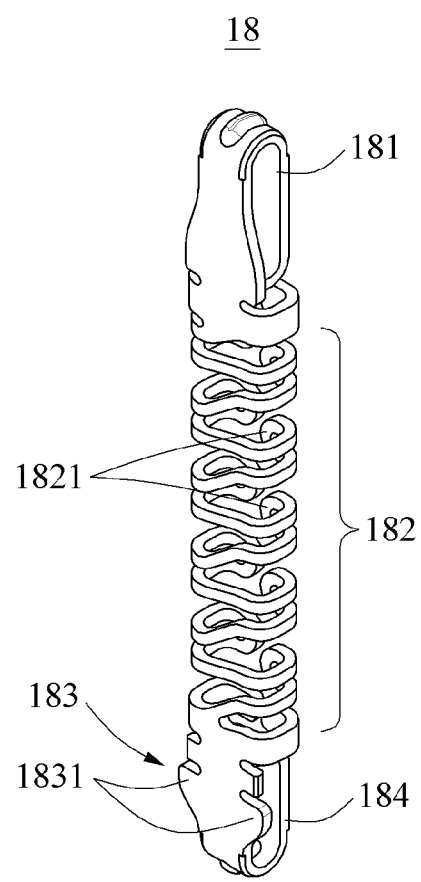
FIG. 4A is a perspective view of a terminal of the pressure sensor of FIG. 1.
Figure 4B:
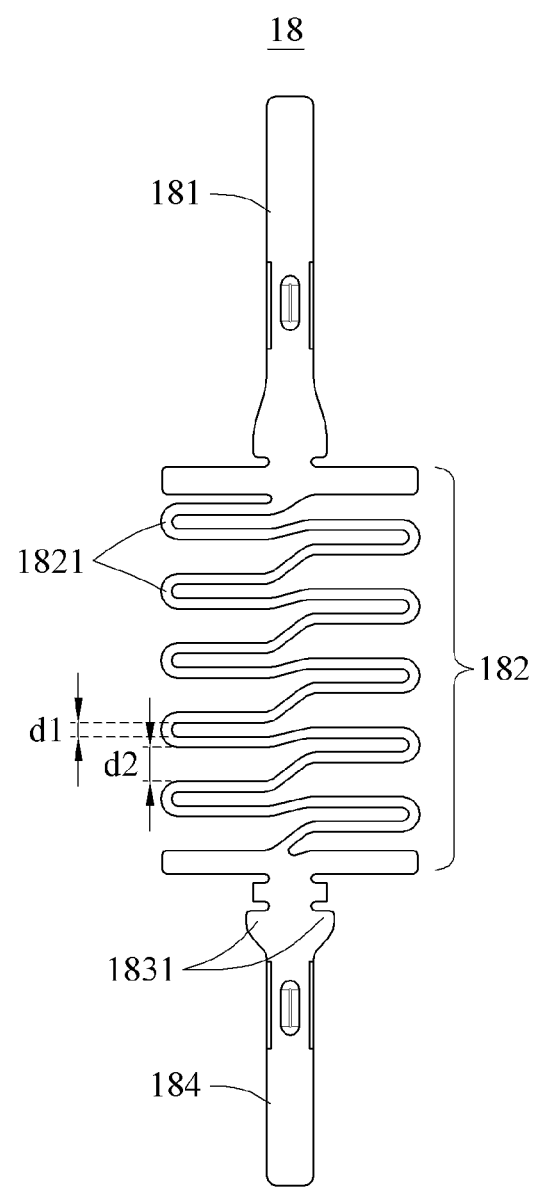
FIG. 4B is a front view of the terminal of FIG. 4A.

The terminal 18 is shown in greater detail in FIGS. 4A and 4B. The terminal 18 may be formed by punching and bending a metal plate. FIG. 4B shows a state of the terminal 18 before the bending process is performed after the punching process is performed in the terminal manufacturing process.

The contractor 181 is disposed on an upper side of the terminal 18, and the resilient portion 182 may be provided on a lower side of the contactor 181. In addition, a fastener 183 and/or a connector 184 may be provided on a lower side of the resilient portion 182. The contactor 181 protrudes out of an upper side of the terminal holder 16 to come into contact with the contact point of the external device, and receives a pressing force from the contact point of the external device. The resilient portion 182 is resiliently transformed when the contactor 181 receives the pressing force from the contact point of the external device.

The fastener 183 is pressed in the terminal holder 16 when the terminal 18 is inserted in the terminal holder 16, and then pressed on an inner wall of the terminal holder 16, and thus may allow the terminal 18 to be fixed at a predetermined position. A pressing protrusion 1831 may be provided at an endmost edge of the fastener 183.

The connector 184 extends in a direction of a lower side of the terminal holder 16 from the resilient portion 182 or the fastener 183, and is electrically connected to the substrate 14.

The resilient portion 182 is provided in a form in which a wire material is extended upwards and downwards, while being repetitively bent leftwards and rightwards. Through the bending process performed on the resilient portion 182, a bent portion 1821, which is bent leftwards and rightwards at the time of punching as shown in FIG. 4A, may be bent to face another portion of the resilient portion 182.

The resilient portion 182 is extended and contracted each time the contactor 181 is pressed on the contact point of the external device. Thus, when a fracture surface of the terminal 18 formed in the punching process comes into contact with the inner wall of the terminal holder 16, an inner wall surface of the terminal holder 16 may be repetitively affected thereby, and thus durability may deteriorate. However, according to the shown embodiment, when the bent portion 1821 is formed to face another portion of the resilient portion 182, an influence of the fracture surface on the inner wall surface of the terminal holder 16 may be reduced, and thus the durability may be improved. In addition, when the resilient portion 182 is bent as shown in FIG. 4A, the terminal 18 may become smaller, and accordingly the pressure sensor 10 may be smaller. Although the bent portion 1821 is formed to face the other portion of the resilient portion 182, the bent portion 1821 may be bent more deeply when a space is available.

As shown in FIG. 4B, a first distance in one bent portion 1821 in an inner upward direction and an inner downward direction at the time of punching to form the resilient portion 182 is d1, and a distance between two bent portions 1821 that are adjacent to each other upwards and downwards at the time of punching is d2. Here, d2 may be greater than d1.

When the resilient portion 182 is compressed by being pressed on the contact point of the external device, the bent portion 1821 may have a relatively high rigidity, and the rigidity may act as a deformation resistance. That is, when the resilient portion 182 is compressed, and an inner side (for example, a measure of d1 portion) and an outer side (for example, a measure of d2 portion) of the bent portion 1821 are compared to each other, the inner side may be more compressed upwards and downwards compared to the outer side. Thus, when d1 and d2 are designed to be equal to each other, no further compression may occur because the wire material is in contact first in the outer side (or the measure of d2 portion). However, when d2 is designed to be greater than d1, more deformation in a smaller resilient portion 182 may be obtained. However, the case in which d1 and d2 are designed to be equal to each other is not excluded from the present disclosure.

Figure 5:
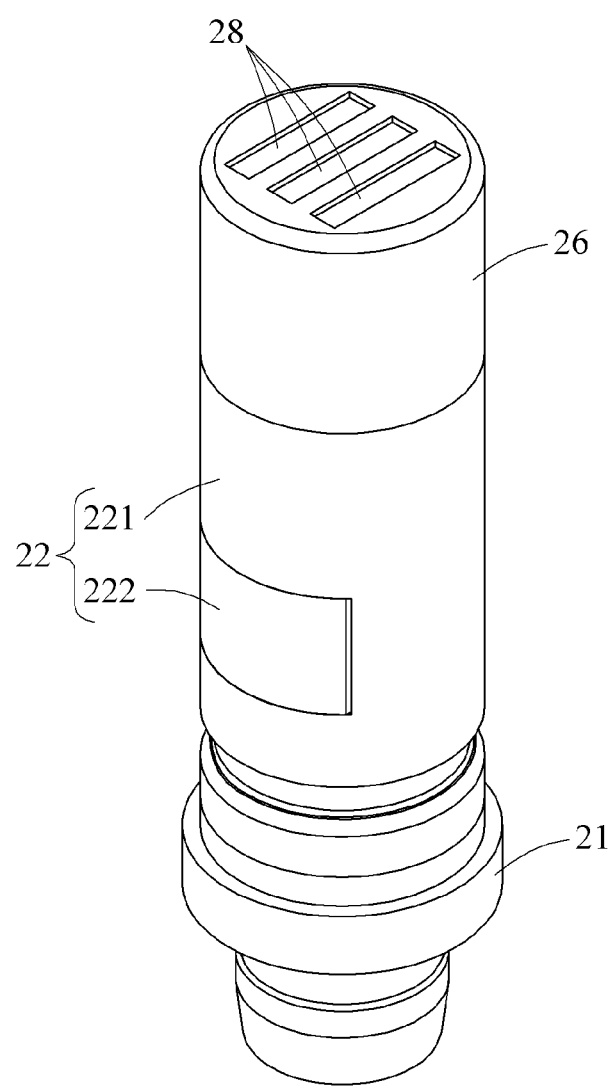
FIG. 5 is a perspective view of a pressure sensor according to a second embodiment of the invention.
Figure 6:
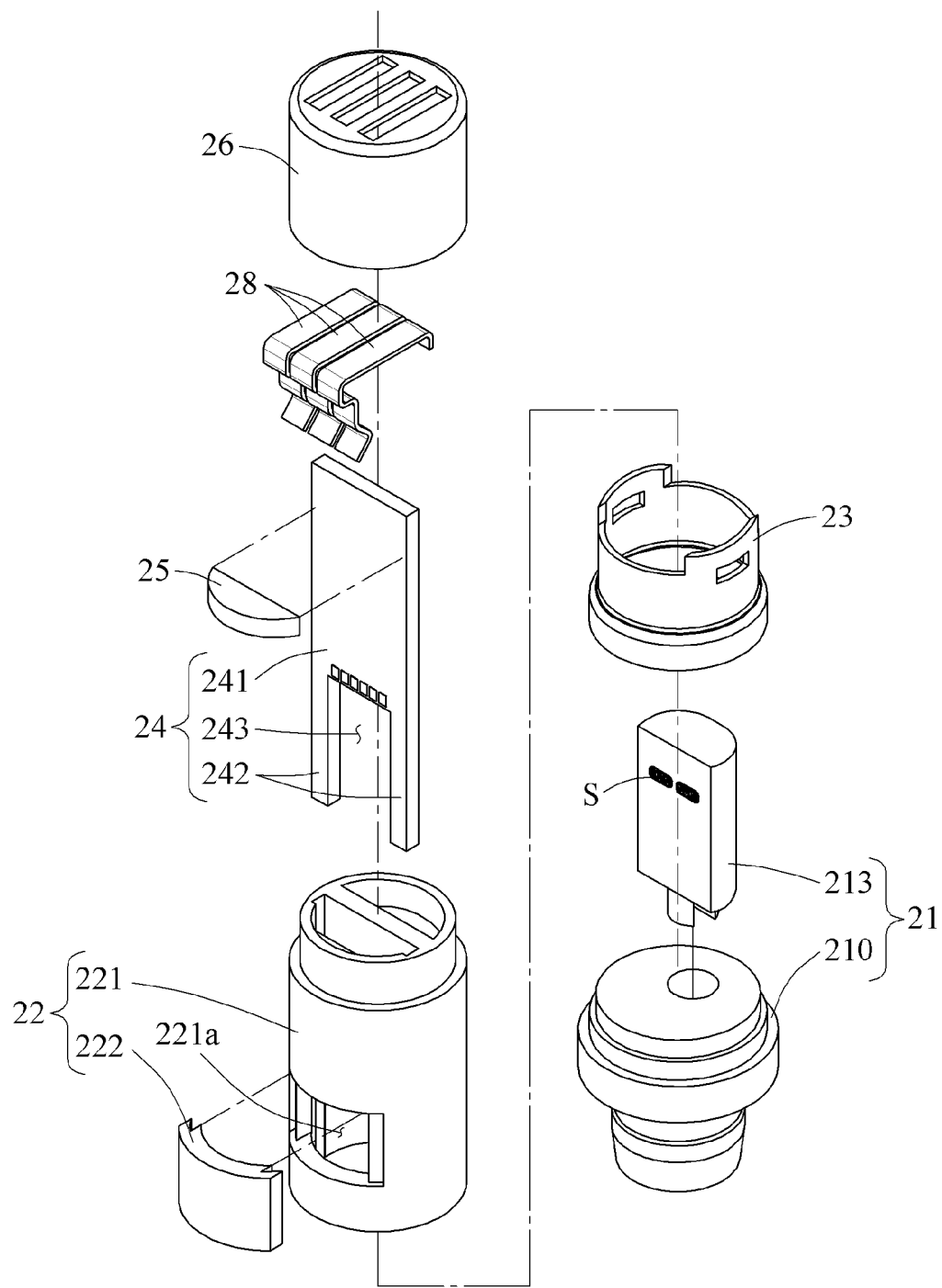
FIG. 6 is an exploded perspective view of the pressure sensor of FIG. 5.
Figure 7:
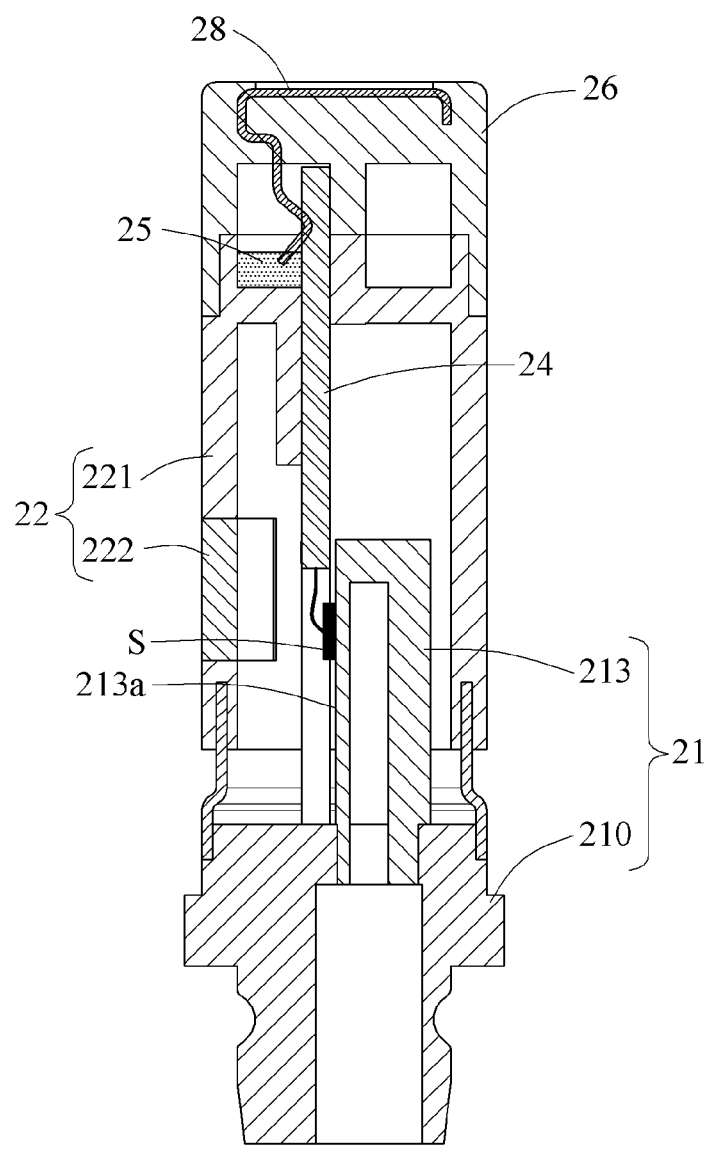
FIG. 7 is a sectional view of the pressure sensor of FIG. 5.
Figure 8:
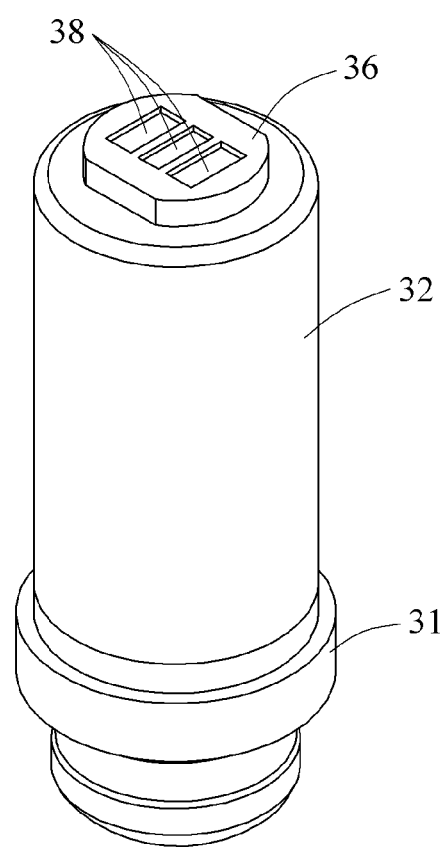
FIG. 8 is a perspective view of a pressure sensor according to a third embodiment of the invention.
Figure 9:
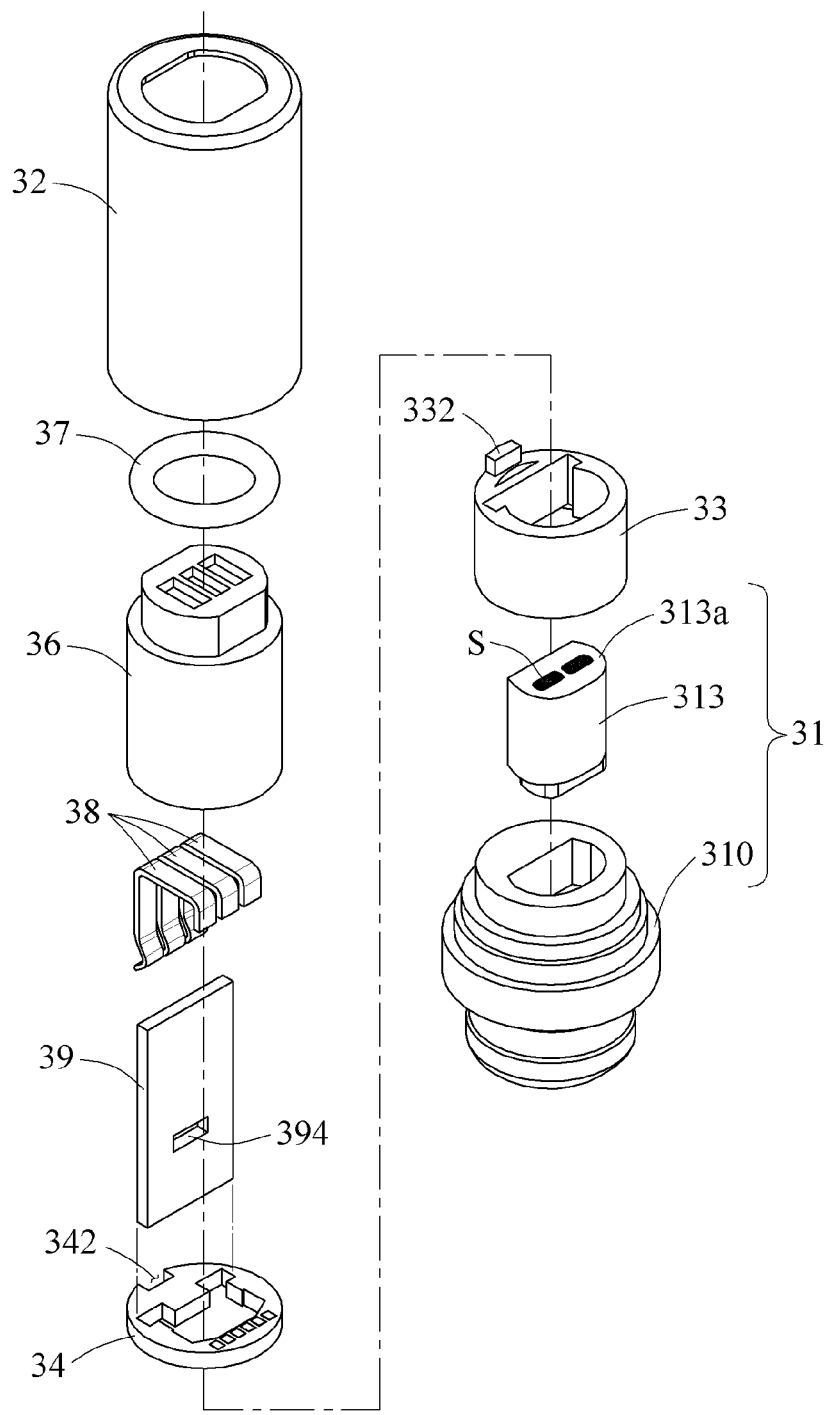
FIG. 9 is an exploded perspective view of the pressure sensor of FIG. 8.
Figure 10:
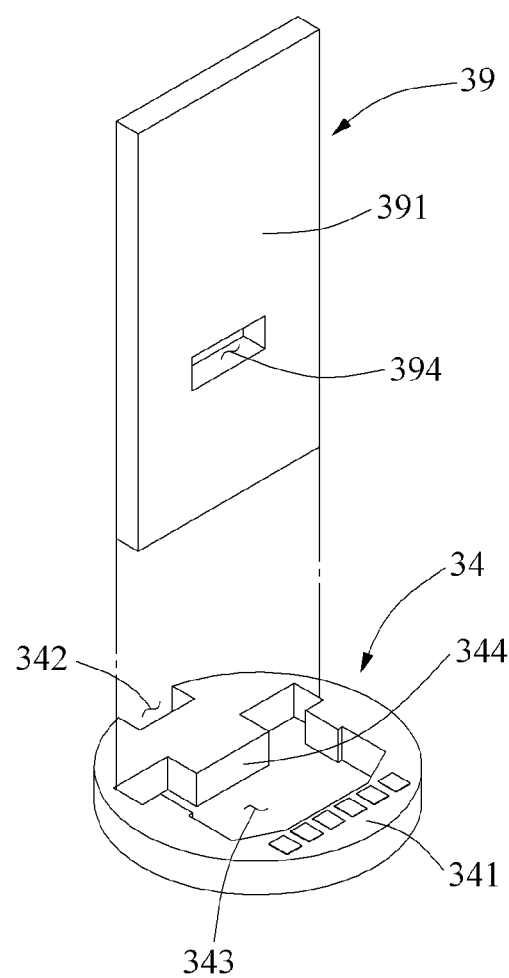
FIG. 10 is a perspective view of a first substrate and a second substrate of the pressure sensor of FIG. 8.
Figure 11:
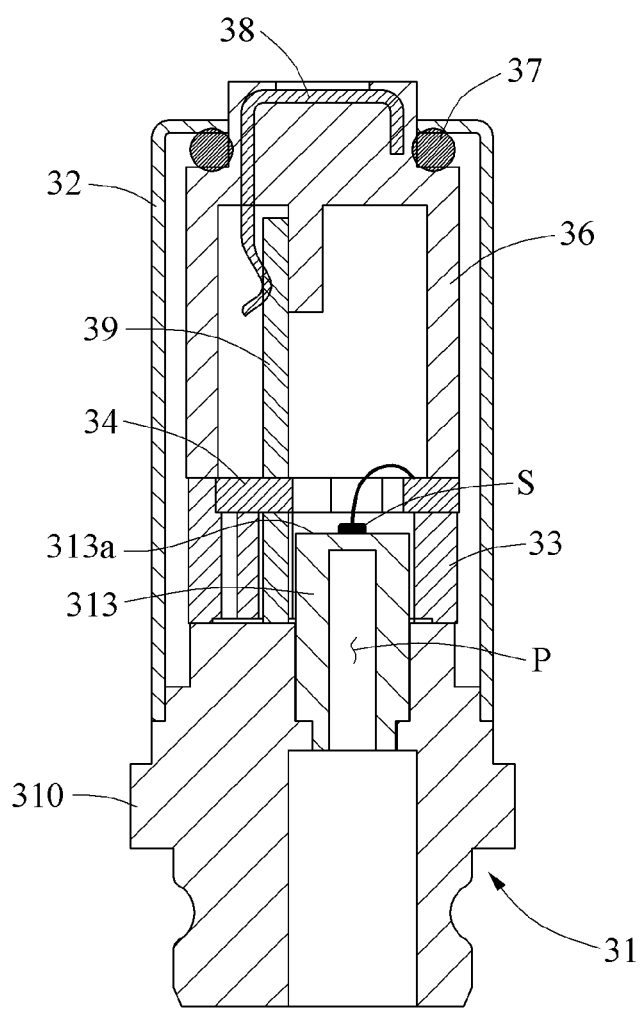
FIG. 11 is a sectional view of the pressure sensor of FIG. 8.
Figure 12:
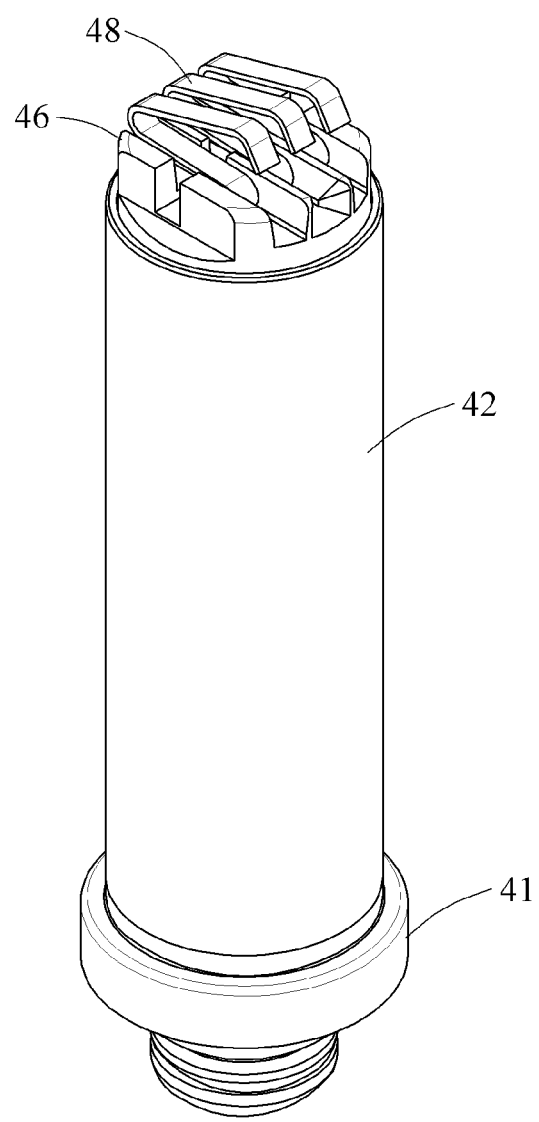
FIG. 12 is a perspective view of a pressure sensor according to a fourth embodiment of the invention.
Figure 13:
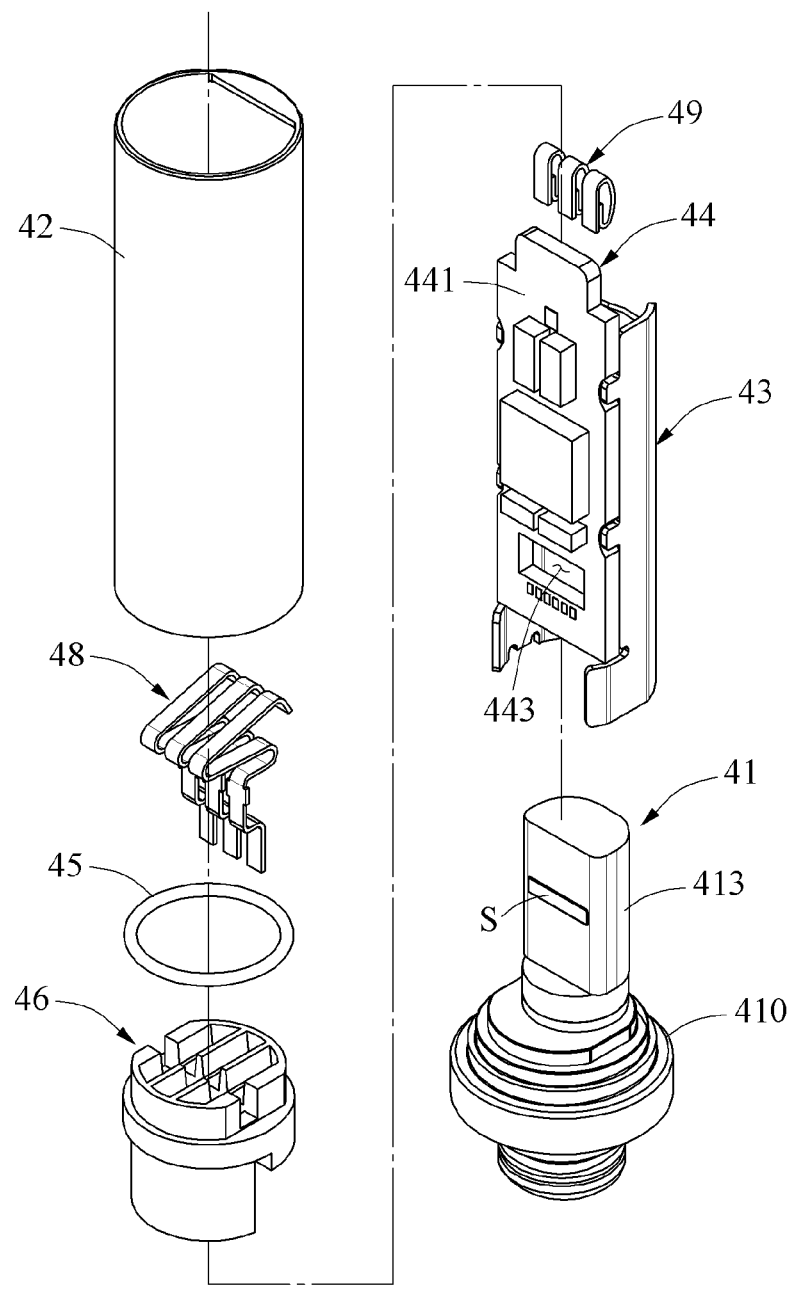
FIG. 13 is an exploded perspective view of the pressure sensor of FIG. 12.
Figure 14:
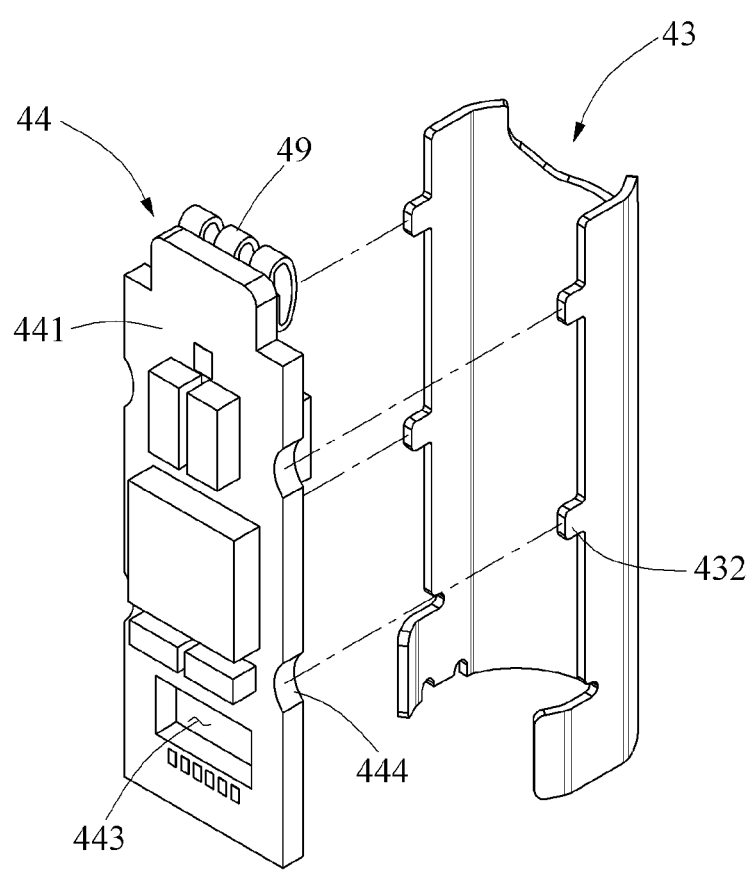
FIG. 14 is a perspective view of a frame and a substrate of the pressure sensor of FIG. 12.

A pressure sensor 20 according to another embodiment of the invention is shown in FIGS. 5-7. The pressure sensor 20 includes a sensing module 21 including a sensing port 210, a sensing body 213, and a strain gauge S, a housing 22, a frame 23, a substrate 24, a support 25, a terminal holder 26, and a terminal 28.

The sensing body 213 of the sensing module 21 includes a sensing face 213a that is flat and disposed on a side face of the sensing body 213. The sensing face 213a may be disposed in parallel to the substrate 24. For example, the sensing body 213 may be provided in a form of a column of which a cross-sectional face is formed in a semicircular shape. A thickness of the sensing face 213a may be less than a thickness of another face of the sensing body 213. Based on such a form, a degree of deformation or transformation of the sensing face 213a may be greater than a degree of deformation of the other face, and thus a sensitivity of the strain gauge S provided in the sensing face 213a may be improved.

The housing 22 includes a housing body 221 having a working hole 221a on one side and a housing cover 222 provided on the working hole 221a. The working hole 221a may allow at least a portion of the sensing body 213, for example, an upper side, to be externally exposed. By the working hole 221a, wire bonding performed to electrically connect the strain gauge S and the substrate 24 may be more readily performed while the sensing module 21, the frame 23, the substrate 24, and the housing body 221 are being connected. After the wire bonding is performed, the housing cover 222 may be provided to the working hole 221a, and thus prevent the sensing module 21 from being externally exposed. For example, the housing cover 222 may be connected to the working hole 221a through laser welding.

A substrate supporting groove configured to support the substrate 24 in a longitudinal direction is disposed on an inner wall of the housing body 221. The substrate supporting groove is elongatedly formed along a longitudinal direction of the housing body 221. By such a structure, the substrate 24 may be stably supported.

The substrate 24 is elongatedly disposed along a longitudinal direction of the pressure sensor 20. Based on such a disposition, the pressure sensor 20 is smaller in size. The substrate 24 may need to have a predetermined area to secure a space for mounting a circuit or an electronic element to the substrate 24. Thus, when the substrate 24 is disposed in a direction vertical to the longitudinal direction of the pressure sensor 20, a diameter of the pressure sensor 20 may be increased by the area of the substrate 24, and thus a volume of the pressure sensor 20 may be unnecessarily increased. However, as described above, when the substrate 24 is elongatedly disposed along the longitudinal direction of the pressure sensor 20, an unnecessary volume may be minimized, and thus the volume of the pressure sensor 20 may be reduced.

The substrate 24 includes a mounting portion 241 to which an internal circuit is mounted to form an electrical connection between the strain gauge S and the terminal 28, a leg portion 242 configured to support the substrate 24 from the sensing module 21, and an opening 243 overlapping a portion of a side face of the sensing body 213.

The leg portion 242 extends downwards from the mounting portion 241. The leg portion 242 is disposed at both sides with the opening 243 being at a center therebetween. That is, the opening 243 is defined as a space between two legs of the leg portion 242. The opening 243 overlaps at least a portion of the sensing face 213a. Based on such a form, the electrical connection between the substrate 24 and the strain gauge S may be more readily performed in a state in which the substrate 24, the housing body 221, and the sensor module 21 are connected.

The support 25 is disposed between one face of the substrate 24 and an inner wall of the housing body 221 so that the substrate 24 may be stably supported in the housing body 221. The support 25 may be formed of, for example, silicon epoxy.

The terminal holder 26 supports the terminal 28. The terminal holder 26 includes a terminal support having a form corresponding to a form of the terminal 28. The terminal holder 26 is fixed to an upper side of the housing body 221 to prevent the terminal 28 from being externally separated. On an upper face of the terminal holder 26, at least one terminal hole allows the terminal 28 to be externally exposed. The terminal hole may be formed to be smaller than an area of the upper face of the terminal 28 so that the terminal 28 does not protrude externally. Consequently, damage that may be done to the terminal 28 while transporting the pressure sensor 20 may be minimized or eliminated without requiring an additional protection member.

The terminal 28, as shown in FIG. 7, is formed by being bent a plurality of times. Based on such a form, the terminal 28 is resilient when in contact with a contact point of an external device, and thus, a electrical connection is secured.

A pressure sensor 30 according to another embodiment of the invention is shown in FIGS. 8-11. The pressure sensor 30 has a sensing module 31 including a sensing port 310, a sensing body 313, and a strain gauge S, a housing 32, a frame 33, a first substrate 34, a second substrate 39, a terminal holder 36, an o-ring 37, and a terminal 38. The sensing body 313 includes a sensing face 313a that is flat and disposed on an upper face of the sensing body 313.

The frame 33 supports the first substrate 34 and/or the second substrate 39. A supporting protrusion 332 on an upper side of the frame 33 supports the first substrate 34. In an inner wall of the frame 33, a substrate supporting groove supports the second substrate 39 in a longitudinal direction.

The first substrate 34 is disposed on the upper side of the frame 33. The first substrate 34 is disposed in a direction orthogonal to a longitudinal direction of the housing 32. The first substrate 34 includes an opening overlapping the sensing face 313a, a supporting groove 342 to be fastened to the supporting protrusion 332, and a fitting protrusion 344 to be fastened to the second substrate 39. The supporting groove 342 is retracted inwards from a circumference of the first substrate 34. The fitting protrusion 344 protrudes from a wall on one side of the opening. By the opening of the first substrate 34, an electrical connection between the first substrate 34 and the strain gauge S may be readily formed in a state in which the first substrate 34, the housing 32, and the sensor module 31 are connected.

The second substrate 39 is disposed in a direction crossing the first substrate 34. The second substrate 39 is disposed in a direction parallel to the longitudinal direction of the housing 32. Based on such a form, a circuit and/or an electronic element that is needed for the first substrate 34 and the second substrate 39 is distributively disposed, and thus an area of the first substrate 34 may be reduced and an entire volume of the pressure sensor 30 may be accordingly reduced. The second substrate 39 includes a fitting groove 394 to be fastened to the fitting protrusion 344. The second substrate 39 and the first substrate 34 may be electrically connected to each other by a contact point formed between the fitting groove 394 and the fitting protrusion 344. Also, the second substrate 39 and the first substrate 34 may be electrically connected through an additional wire bonding.

A pressure sensor 40 according to another embodiment of the invention is shown in FIGS. 12-15. The pressure sensor 40 has a sensing module 41 including a sensing port 410, a sensing body 413, and a strain gauge S, a housing 42, a frame 43, a substrate 44, an o-ring 45, a terminal holder 46, a first terminal 48, and a second terminal 49. The sensing body 413 includes a sensing face 413a that is flat and disposed on a side face of the sensing body 413.

The frame 43 supports the substrate 44 in a longitudinal direction of the housing 42. The frame 43 includes at least one supporting protrusion 432 supporting a side face of the substrate 44. In a state in which the sensor module 41, the frame 43, and the substrate 44 are connected, the frame 43 and the substrate 44 form a closed loop that covers a circumference of the sensing body 413.

The substrate 44 includes a mounting portion 441, an opening 443 overlapping the sensing face 413a, and a supporting groove 444 to be fastened to the supporting protrusion 432.

Figure 15:
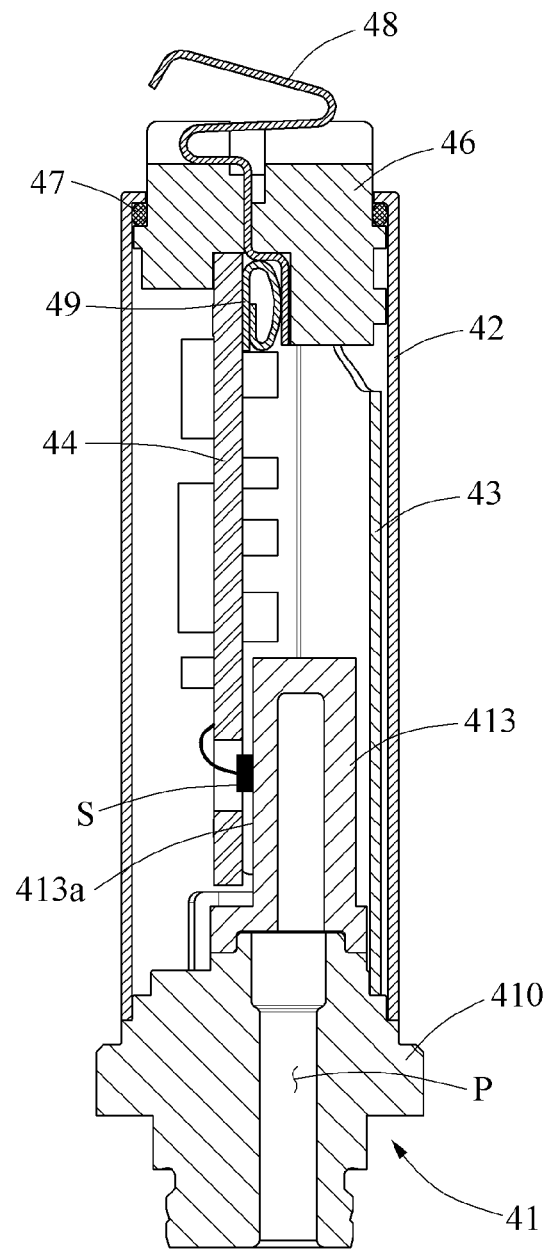
FIG. 15 is a sectional view of the pressure sensor of FIG. 12.

The first terminal 48, as shown in FIG. 15, is bent a plurality of times. Based on such a form, the first terminal 48 is resilient when the first terminal 48 comes into contact with a contact point of an external device, and thus an electrical connection is established. An upper side of the first terminal 48 protrudes out of an upper side of the terminal holder 46.

The second terminal 49 is disposed on an upper side of the substrate 44. The second terminal 49 is bent a plurality of times and thus also has resilience. The second terminal 49 electrically connects the first terminal 48 and the substrate 44. By the second terminal 49, the electrical connection between the first terminal 48 and the substrate 44 may be readily performed. In a state in which the second terminal 49 is installed on the substrate 44 and the terminal holder 46 in which the first terminal 48 is inserted is connected thereto, a lower side portion of the first terminal 48 is resiliently connected to the second terminal 49, and thus an electrical connection of the first terminal 48, the second terminal 49, and the substrate 44 is readily established.

Figure 16A:
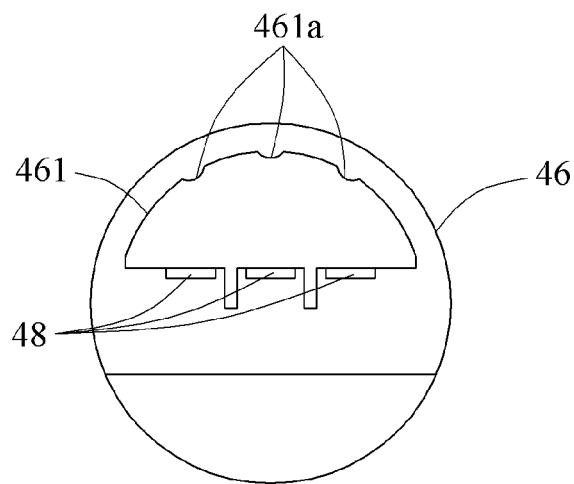
FIG. 16A is a top view of a terminal holder and a housing of the pressure sensor of FIG. 12.
Figure 16B:
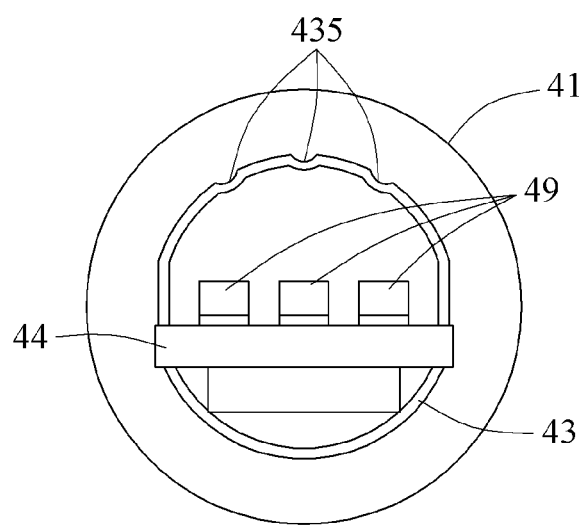
FIG. 16B is a top view of the terminal holder and the housing of FIG. 16A.

As shown in FIGS. 16A and 16B, the frame 43 has a first curved portion 435 disposed on an upper side of the frame 43. The terminal holder 46 includes an insertion portion 461 inserted into the frame 43, and the insertion portion 461 includes a second curved portion 461a corresponding to the first curved portion 435. By such a form, an accurate position at which the frame 43 and the terminal holder 46 are connected is guided, and thus rotation of the frame 43 and the terminal holder 46 relative to each other is prevented.

Figure 17:
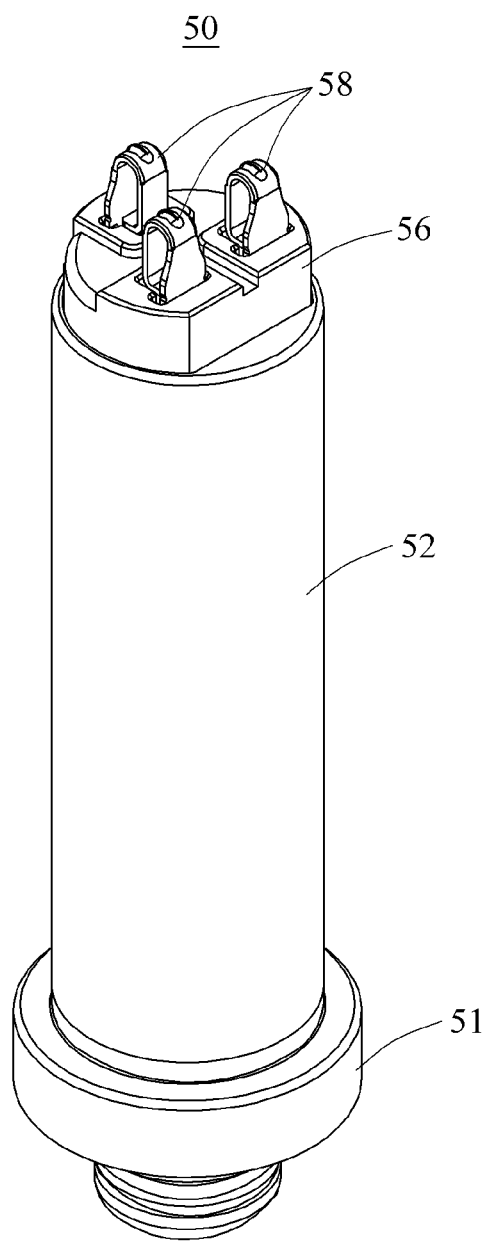
FIG. 17 is a perspective view of a pressure sensor according to a fifth embodiment of the invention.
Figure 18:
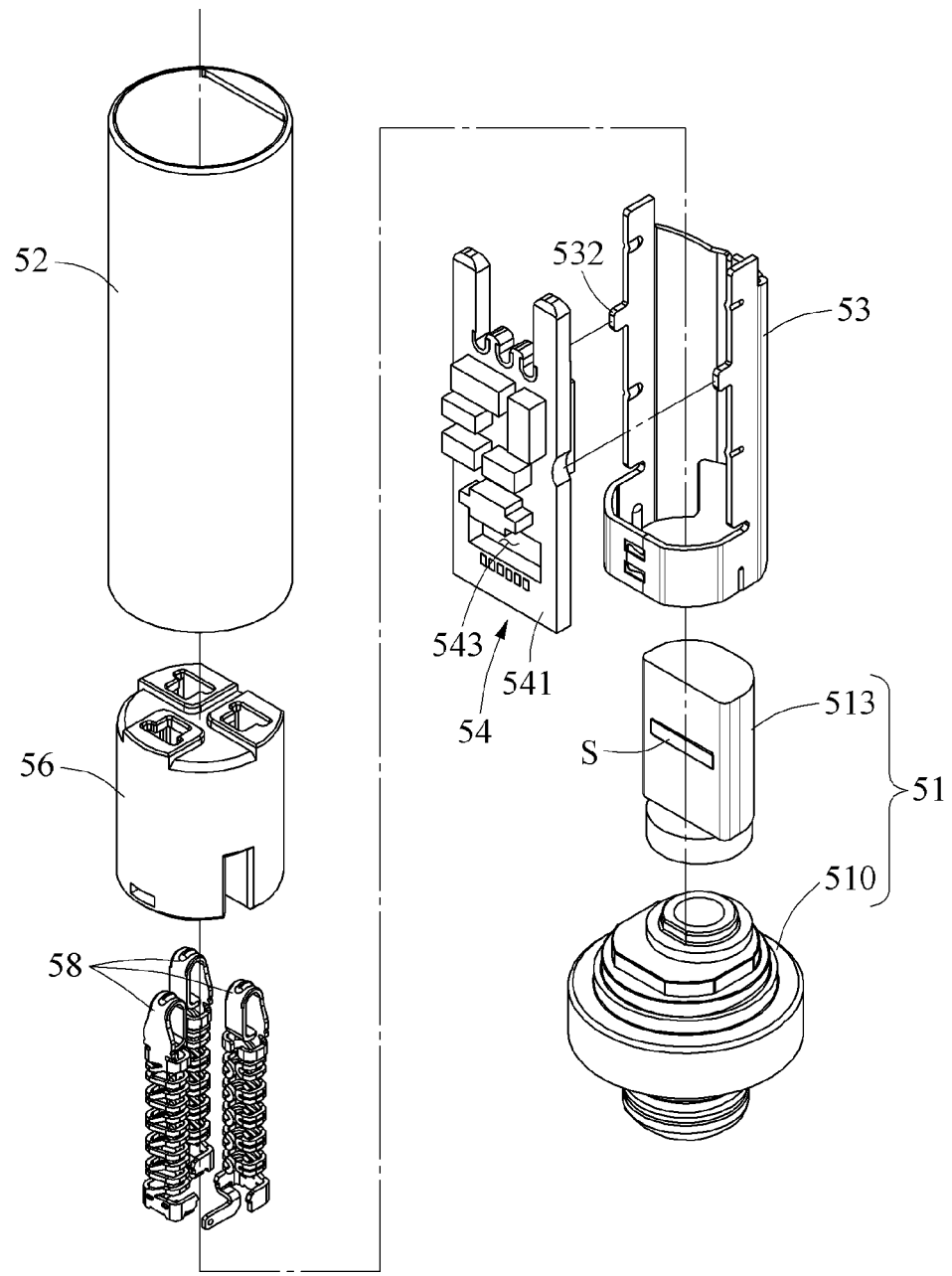
FIG. 18 is an exploded perspective view of the pressure sensor of FIG. 17.
Figure 19:
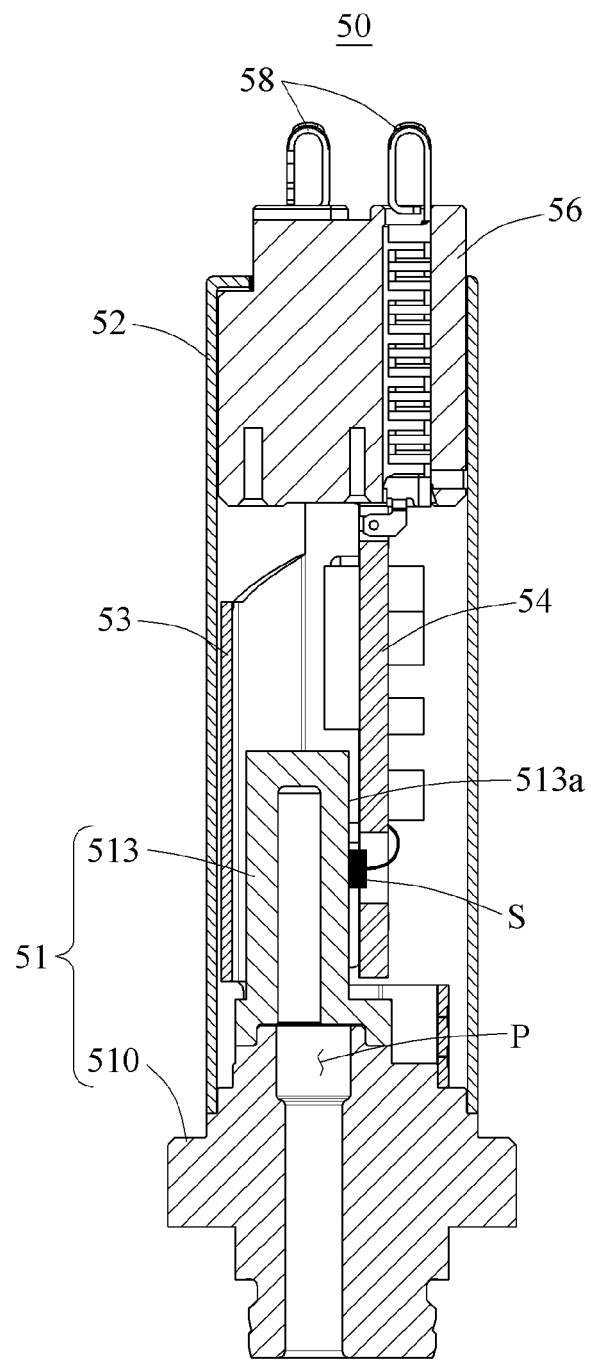
FIG. 19 is a sectional view of the pressure sensor of FIG. 17.

A pressure sensor 50 according to another embodiment of the invention is shown in FIGS. 17-19. The pressure sensor 50 has a sensor module 51 including a sensing port 510, a sensing body 513, and a strain gauge S, a housing 52, a frame 53 including a supporting protrusion 532, a substrate 54 including a mounting portion 541 and an opening 543, a terminal holder 56, and a terminal 58. The sensing body 513 includes a sensing face 513a that is flat and disposed on a side face of the sensing body 513.

Figure 20A:
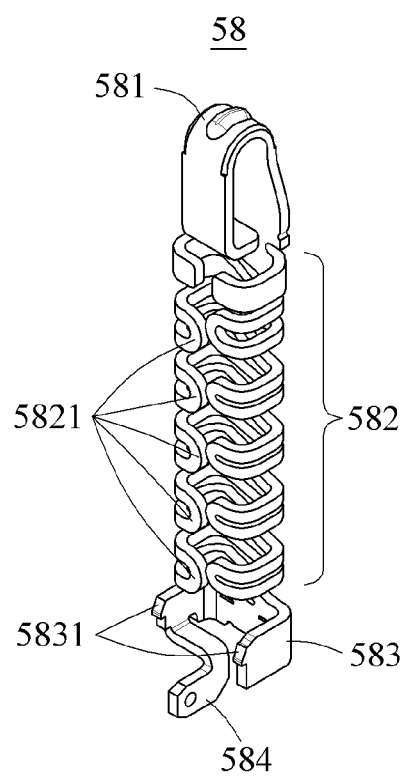
FIG. 20A is a perspective view of a terminal of the pressure sensor of FIG. 17.
Figure 20B:
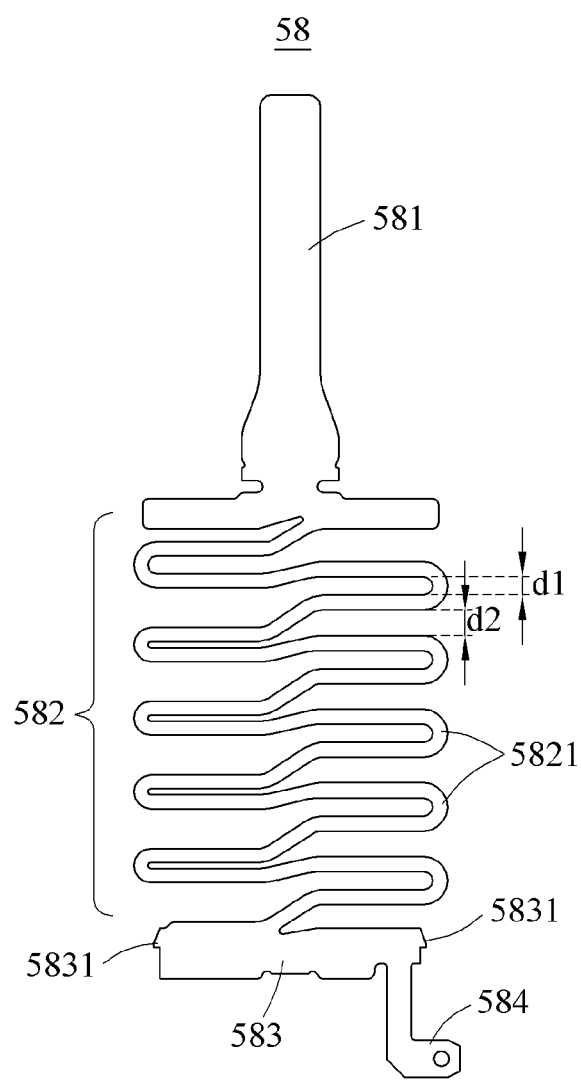
FIG. 20B is a front view of the terminal of FIG. 20A.
Figure 21:
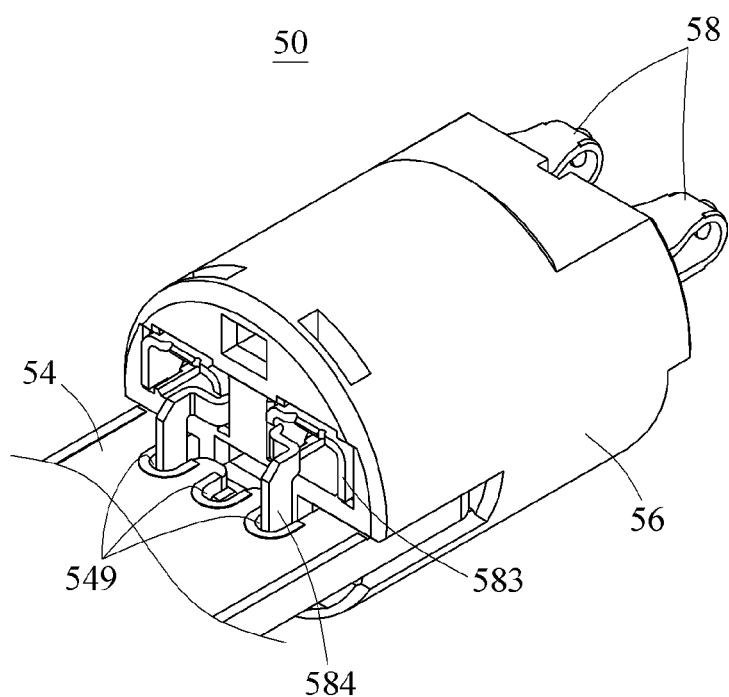
FIG. 21 is a perspective view of a substrate and a terminal of the pressure sensor of FIG. 17.

As shown in FIGS. 20A-21, the terminal 58 is bent to be in a form shown in FIG. 20A after being punched to be in a form shown in FIG. 20B. A contactor 581 is formed on an upper side of the terminal 58, and a resilient portion 582 is formed on a lower side of the contactor 581. A fastener 583 and/or a connector 584 are formed on a lower side of the resilient portion 582. The resilient portion 582 includes a bent portion 5821. The fastener 583 includes a pressing protrusion 5831.

As shown in FIG. 20A, an end portion of the connector 584 extends in a direction orthogonal to the substrate 54. A width direction of the end portion of the connector 584 is equal to a length, or longitudinal, direction of the substrate 54. That is, the width direction of the end portion of the connector 584 is equal to a length, or longitudinal, direction of the housing 52. As shown in FIG. 20B, in a state before the punching process is performed, the end portion of the connector 584 extends in a direction same as a longitudinal direction of the fastener 583. By such a form, the terminal 58 and the substrate 54 are more strongly connected, and the connector 584 of the terminal 58 is prevented from being separated from the substrate 54 due to a force on the terminal 58 from a contact point of an external device.

As shown in FIG. 21, a terminal hole 549 into which the connector 584 is to be inserted may be formed on an upper side of the substrate 54. The terminal hole 549 is elongatedly formed in the longitudinal direction of the substrate 54. The terminal hole 549 includes a contact point that is connectable to the connector 584. The connector 584 is physically connected to the substrate 54 by being inserted into the terminal hole 549. Simultaneously, the connector 584 is electrically connected to the substrate 54 by being connected to the contact point in the terminal hole 549. By such a structure, the substrate 54 supports the terminal 58, and thus a disconnection of the terminal 58 from the substrate 54 that may occur when the terminal 58 is pushed by a connecting force generated when the pressure sensor 50 is connected to the contact point of the external device is prevented. For a strong connection between the connector 584 and the contact point in the terminal hole 549, for example, soldering, may be used when the connector 584 is inserted in the terminal hole 549. In other embodiments, the terminal hole 549 may not be additionally provided on the substrate 54. In such a case, the connector 584 may be connected through, for example, soldering, when the substrate 584 is placed on a contact point disposed on the substrate 54.

Figure 22:
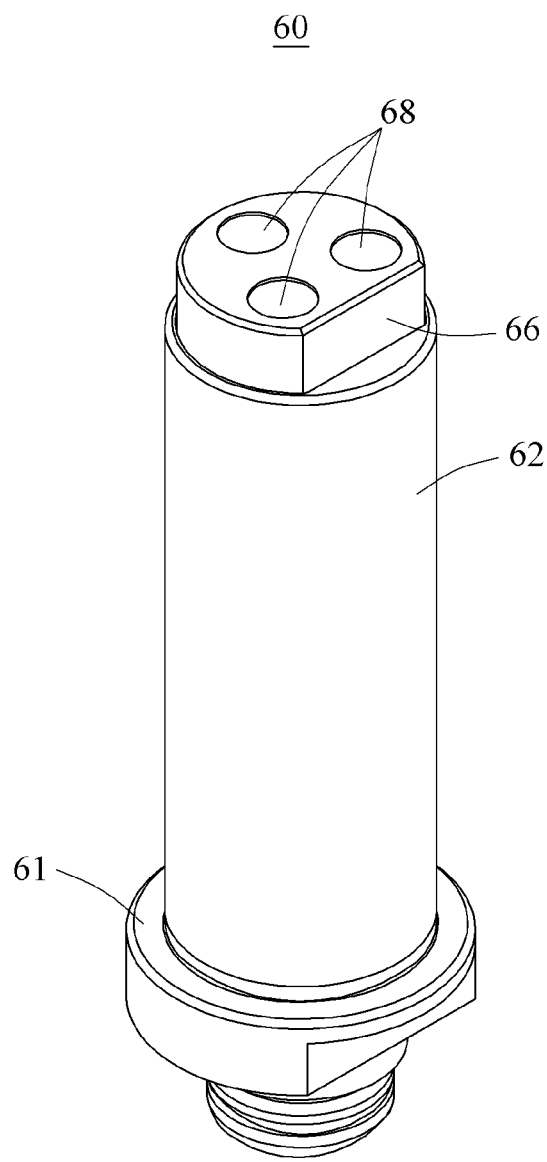
FIG. 22 is a perspective view of a pressure sensor according to a sixth embodiment of the invention.
Figure 23:
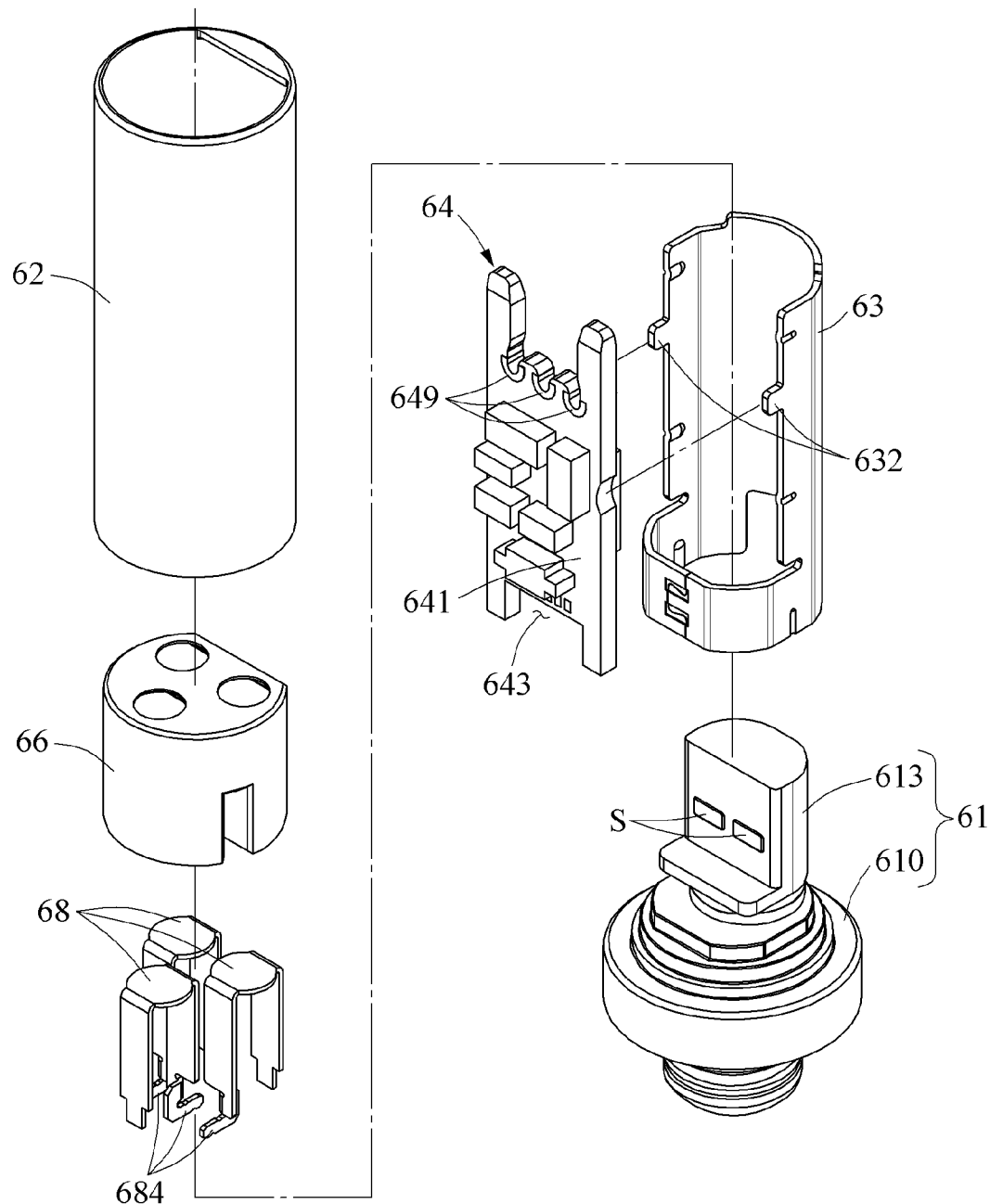
FIG. 23 is an exploded perspective view of the pressure sensor of FIG. 22.
Figure 24:
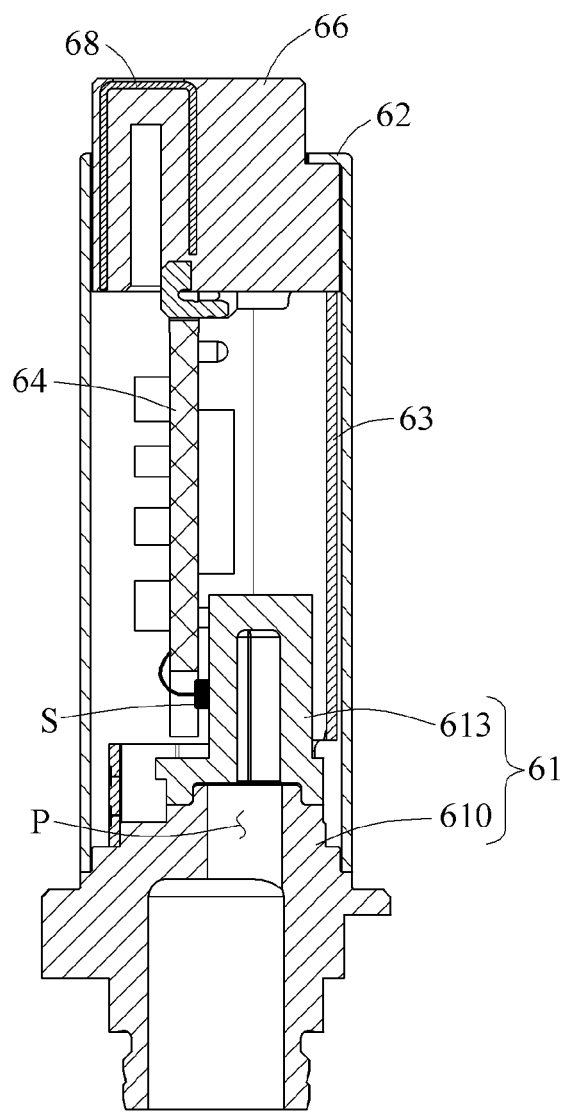
FIG. 24 is a sectional view of the pressure sensor of FIG. 22.

A pressure sensor 60 according to another embodiment of the invention is shown in FIG. 22-24. The pressure sensor 60 has a sensing module 61 including a sensing port 610, a sensing body 613, and a strain gauge S, a housing 62, a frame 63 including a supporting protrusion 632, a substrate 64 including a mounting portion 641, an opening 643, and a terminal hole 649, a terminal holder 66, and a terminal 68.

The terminal 68 includes a connector 684 corresponding to the terminal hole 649. The terminal 68 is externally exposed through a hole formed on an upper face of the terminal holder 66. As shown in FIG. 22, the terminal 68 does not protrude out of an upper side of the terminal holder 66. The hole formed on the upper face of the terminal holder 66 is smaller than a width of an upper face of the terminal 68, or a contactor, and thus the terminal 68 is prevented from being separated through the hole formed on the upper face of the terminal holder 66. That is, the contactor of the terminal 68 that comes into contact with a contact point of an external device is supported by an inner wall of the upper face of the terminal holder 66.

Advantageously, according to a pressure sensor of the present invention, the pressure sensor has a reduced volume and volume of an entire product in which the pressure sensor is provided is also reduced.

What is claimed is:
1. A pressure sensor, comprising:
a sensor module having a strain gauge measuring a pressure of a gas flowing into a passage of the sensor module;
a substrate electrically connected to the strain gauge;
a frame covering a portion of the sensor module and supporting the substrate;
a terminal electrically connected to the substrate and contacting a contact point of an external device, the terminal having a contactor contacting the contact point of the external device and receiving a pressing force from the contact point of the external device and a connector disposed on a lower side of the contactor electrically connected to the substrate and a resilient portion connecting the contactor and the connector, the resilient portion resiliently transformed by the pressing force applied to the contactor by the contact point of the external device and the terminal is integrally formed by punching and bending a metal plate, and the resilient portion is formed as a wire material extending upwards and having a plurality of bent portions bent leftwards and rightwards, each bent portion facing another bent portion;
a terminal holder supporting the terminal; and
a housing having an end connected to the sensor module and covering a portion of the terminal holder.

2. The pressure sensor of claim 1, wherein the contactor protrudes out of an upper side of the terminal holder.

3. The pressure sensor of claim 1, wherein the contactor is supported by an inner wall of an upper face of the terminal holder.

4. The pressure sensor of claim 1, wherein the connector is resiliently connected to a contact point of the substrate.

5. The pressure sensor of claim 1, wherein the connector is soldered to a contact point of the substrate.

6. The pressure sensor of claim 1, wherein, after punching, the resilient portion has a first distance in each bent portion and a second distance between each of the plurality of bent portions, the first distance less than the second distance.

7. The pressure sensor of claim 1, wherein the sensor module has a sensing port disposed in an inflow side of the passage and exposed externally and a sensing body connected to the sensing port and disposed in the housing, the sensing body having a sensing face to which the strain gauge is attached.

8. The pressure sensor of claim 7, wherein the sensing face is flat in a direction parallel to a longitudinal direction of the housing.

9. The pressure sensor of claim 8, wherein the substrate is disposed in a direction parallel to the sensing face.

10. The pressure sensor of claim 7, wherein the substrate has an opening overlapping the sensing face and a wire electrically connecting the substrate and the strain gauge through the opening.

11. The pressure sensor of claim 7, wherein a thickness of the sensing face is less than a thickness of another face of the sensing body.

12. The pressure sensor of claim 10, wherein the substrate has a first substrate disposed in a direction orthogonal to a longitudinal direction of the housing and connected to the strain gauge and a second substrate disposed in a direction parallel to the longitudinal direction of the housing and electrically connected to the first substrate and the terminal.

13. The pressure sensor of claim 1, wherein the frame and the substrate form a closed loop covering a circumference of a sensing body of the sensing module.

14. The pressure sensor of claim 13, wherein the frame has a supporting protrusion supporting a side face of the substrate and the substrate has a supporting groove fastened to the supporting protrusion.

15. The pressure sensor of claim 1, wherein an upper side of the substrate has a terminal hole into which the connector is inserted.

16. The pressure sensor of claim 15, wherein the terminal hole is elongatedly formed in a longitudinal direction of the substrate.

17. The pressure sensor of claim 16, wherein an end portion of the connector extends in a direction orthogonal to the substrate.

* * * * *